(12) United States Patent
Asbrand et al.

(10) Patent No.: US 6,352,016 B1
(45) Date of Patent: Mar. 5, 2002

(54) HYDRAULIC POWER-ASSISTED STEERING

(75) Inventors: Ulrich Asbrand, Altdorf; Jürgen Class, Illigen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/319,508

(22) PCT Filed: Dec. 2, 1997

(86) PCT No.: PCT/EP97/06737
§ 371 Date: Aug. 3, 1999
§ 102(e) Date: Aug. 3, 1999

(87) PCT Pub. No.: WO98/24677
PCT Pub. Date: Jun. 11, 1998

(30) Foreign Application Priority Data

Dec. 5, 1996 (DE) .......................... 196 50 476

(51) Int. Cl.⁷ ...................... F01B 1/06; F16K 17/38
(52) U.S. Cl. ........................................ 91/491; 137/468
(58) Field of Search ................... 91/419, 447; 137/468

(56) References Cited

U.S. PATENT DOCUMENTS

| | | | |
|---|---|---|---|
| 3,897,717 A | * 8/1975 | Kellner | 91/409 X |
| 4,336,903 A | * 6/1982 | Zirps | 91/419 X |
| 4,354,351 A | * 10/1982 | Dezelan | 91/419 X |
| 5,584,226 A | * 12/1996 | Roemer et al. | 91/447 |
| 5,868,161 A | * 2/1999 | Asbrand et al. | 137/498 |
| 6,003,427 A | * 12/1999 | Asbrand et al. | 91/447 |
| 6,129,111 A | * 10/2000 | Asbrand et al. | 137/468 |

FOREIGN PATENT DOCUMENTS

| | | |
|---|---|---|
| DE | 44 23 658 A1 | 1/1996 |
| JP | 59-217026 | 12/1984 |
| WO | WO 91/03664 | 3/1991 |

* cited by examiner

Primary Examiner—John E. Ryznic
(74) Attorney, Agent, or Firm—Crowell & Moring LLP

(57) ABSTRACT

A hydraulic power steering system, in which the servomotor also acts as a steering damper. Damper valves are arranged on hydraulic lines between the servomotor and servo valve. In order to compensate the temperature-dependent viscosity of the hydraulic medium, throttle elements of the damper valves cooperate with spring arrangements operating as a function of temperature (bimetallic springs, springs consisting of form memory alloy).

6 Claims, 10 Drawing Sheets

HYDRAULIC POWER-ASSISTED STEERING

BACKGROUND OF THE INVENTION

The present invention relates to a hydraulic power steering system having a servomotor configured as a hydrostatic motor assembly or as a hydraulic displacer assembly which also acts as a steering damper. Damper-valve arrangements are provided on hydraulic lines between the servomotor and a servo valve, and the damper-valve arrangements having a throttle resistance controllable as a function of temperature.

Present-day motor vehicles are usually equipped with a power steering system which typically operates with auxiliary hydraulic power, at least where passenger vehicles are concerned. The forces to be exerted by the driver when the vehicle steering system is actuated are always kept sufficiently low.

In order essentially to avoid or suppress vibrations in the steering system, virtually all vehicle steering systems have a steering damper.

DE 28 38 151 A1 discloses a power steering system in which the generation of a boosting force is provided only at a low travelling speed and the servomotor/steering-damper assembly performs merely damping functions at higher travelling speeds. So that changes in viscosity of the hydraulic medium in response to changing temperatures can be compensated in terms of the damping effect, temperature-compensated throttles may be provided, in which a throttle screw cooperates with a stop having a variable temperature coefficient.

DE 40 29 156 A1 and DE 41 06 310 A1 describe how to cause a double-acting piston/cylinder assembly serving as a servomotor to act constantly as a steering damper.

These known damper-valve arrangements provided are, however, comparatively complicated. According to DE 43 23 179 C1, in order to simplify the damper-valve arrangements, the damper valves is formed on a perforated-disc-like valve-carrier part. The holes, through which hydraulic medium passes, can be controlled by valve reeds and/or sprung valve plates which are held on the end face of the valve-carrier part by bolts. In this case, there may be provision for clamping the perforated-disc-like valve-carrier part in the manner of a spacer ring or of a spacer washer between a bearing face of a nipple, arranged on the housing of the servo valve or of the servomotor, and a counterbearing face of the connecting part of the hydraulic line, with the connecting part being connectable to the nipple.

Instead, the valve-carrier part can also be held captive in the nipple or in the connecting part, as illustrated, by way of example, in DE 44 23 658 A1.

DE 36 05 207 A discloses a hydraulic vibration damper which a piston/cylinder assembly and in which a piston working space is connected to a compensating space via a bottom valve. The bottom valve is a damper-valve arrangement having a carrier part in the form of a circular disc, with axial bores and with a central bolt which, on one hand, holds spring plates in the form of a circular disc for controlling some of the axial bores and, on the other hand, on that side of the carrier part facing away from the spring plates, guides an annular disc for controlling the other axial bores. An axial duct is formed in the bolt. The axial duct is controlled as a function of temperature by a bimetallic spring which, in turn, is mounted on bolt-side holding devices.

SUMMARY OF THE INVENTION

An object of the present invention, then, is to improve even further a power steering system and, in particular, to adapt the operating behavior to different external influences.

This object is achieved, according to the invention, in that, in a power steering system, the damper-valve arrangements each have at least one duct with a closing or throttle member which is tensioned into its closing or throttling position by a spring arrangement having a highly temperature-dependent spring force markedly decreasing at a falling temperature.

The invention is based on the general recognition of controlling the throttle resistance, and consequently the damper effect of the damper-valve arrangement, as a function of temperature, in order to achieve adaptation to the temperature-dependent viscosity of the hydraulic medium. At very low temperature, the hydraulic medium becomes markedly more viscous, with the result that the hydraulic medium can flow less easily through the damper-valve arrangements. According to the invention, then, this effect is largely compensated in that unthrottling of the damper-valve arrangements takes place at low temperature.

The spring arrangements operating as a function of temperature may have springs consisting of a form memory alloy and/or bimetallic springs. As regards springs consisting of a form memory alloy, the spring behavior changes abruptly when a narrow transition-temperature range is exceeded or undershot. Bimetallic springs may change their behavior comparatively "creepingly" within a wide temperature range or "snap over" at a temperature threshold value. Optimum adaptation to the changes in viscosity of the hydraulic medium can be achieved by an appropriate selection or combination of the spring elements.

The present invention is of great importance particularly in very cold climatic zones. When the vehicle is travelling in a straight line for lengthy periods, there is no inflow or outflow of hydraulic medium on the servomotor. Since the servomotor is exposed to the slipstream and/or splashwater, the hydraulic medium then remains very cold and viscous. As a result, any hydraulic flow can take place only against markedly increased flow resistance and the steering may become sluggish. These adverse effects are avoided with the invention.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
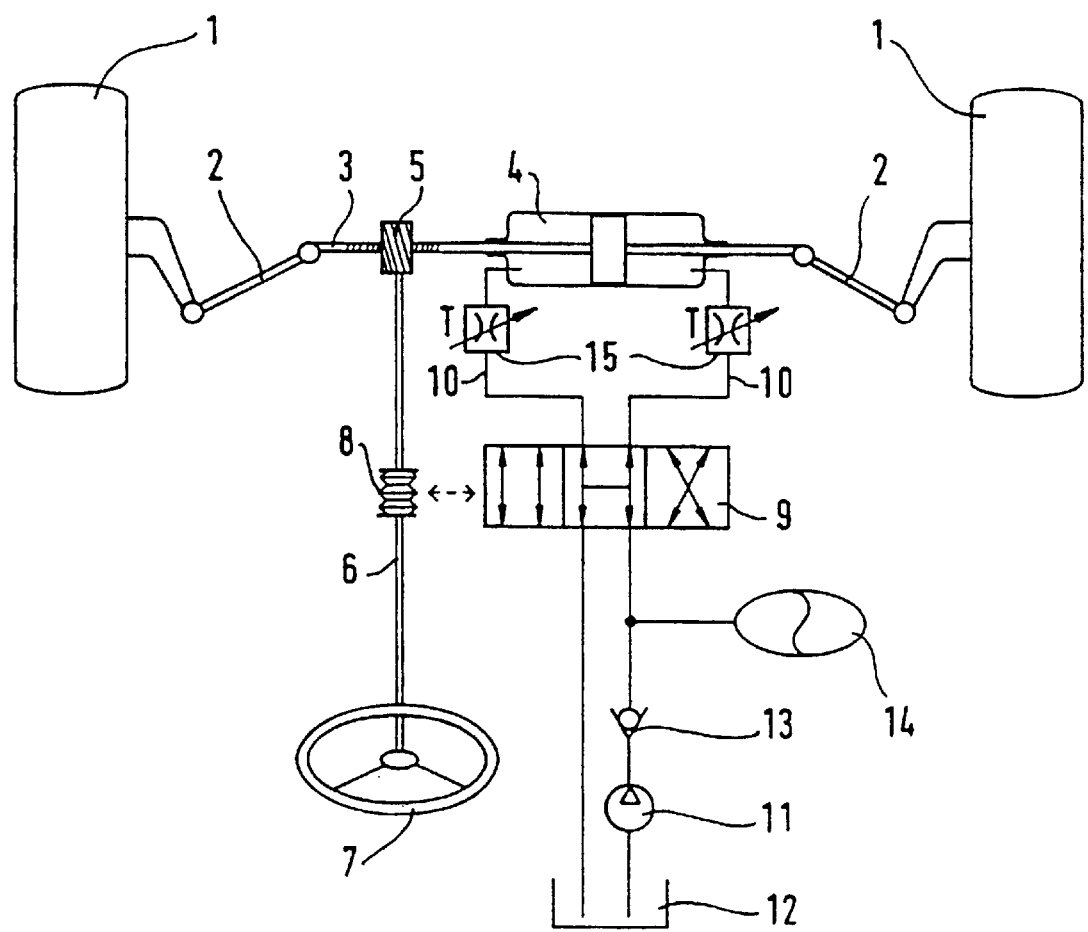
FIG. 1 is a diagrammatic illustration, resembling a circuit diagram, of a hydraulic power steering system with damper valves on the servomotor.

According to FIG. 1, a motor vehicle possesses front steered vehicle wheels 1 which, in the example illustrated, are connected via track rods 2 to a rack 3 which merges coaxially into the piston rod of a double-acting piston/cylinder assembly 4 arranged as a servomotor or is connected to the piston rod.

The rack 3 meshes with a pinion 5 which is drive-connected to a steering wheel 7 via a steering column 6. A torsionally elastic element 8 is arranged in the steering column 6, so that limited relative rotation can occur between the pinion 5 and steering wheel 7, the amount of the relative rotation depends on the forces and moments transmitted between the pinion 5 and steering wheel 7.

This relative rotation controls a servo valve 9 which is connected via motor lines 10 to the two chambers of the piston/cylinder assembly 4 and to the delivery side of a hydraulic pump 11 and to a relatively pressureless hydraulic reservoir 12 connected to the suction side of the pump 11.

When the servo valve 9 is in the illustrated middle position, the two chambers of the piston/cylinder assembly 4 are connected to one another and to the reservoir 12. Moreover, there can be a connection to the delivery side of the pump 11 which can then run constantly.

Alternatively, when the servo valve 9 is in the middle position, the valve connection is shut off to the delivery side of the pump 11 which can charge a pressure accumulator 14 via a nonreturn valve 13 and is controlled as a function of the charging pressure or is switched off at a high charging pressure.

As soon as forces or torques take effect between the pinion 5 and steering wheel 7, the servo valve 9 is displaced out of its middle position in one direction or the other. Consequently, a greater or lesser pressure difference in one direction or the other, and therefore a greater or lesser boosting force of the piston/cylinder assembly 4 in one direction or the other, is generated between the motor lines 10, and the force to be exerted in each case on the steering wheel 7 for a steering manoeuvre is reduced correspondingly.

In the steering system according to the invention, the piston/cylinder assembly 4 serving as a servomotor also performs the function of a steering damper for damping rapid changes in steering angle of the steered vehicle wheels 1. For this purpose, damper valves 15 are each arranged at the connections of the lines 10 on the piston/cylinder assembly 4. The damper valves operate as a function of temperature in a manor illustrated in more detail below. FIG. 1 illustrates the damper valves 15 as throttles controllable by a temperature T. By virtue of the throttle resistance of the damper valves 15, rapid movements of the piston of the piston/cylinder assembly 4 and, correspondingly, rapid steering adjustments of the steered vehicle wheels 1, are damped.

Figure 2:
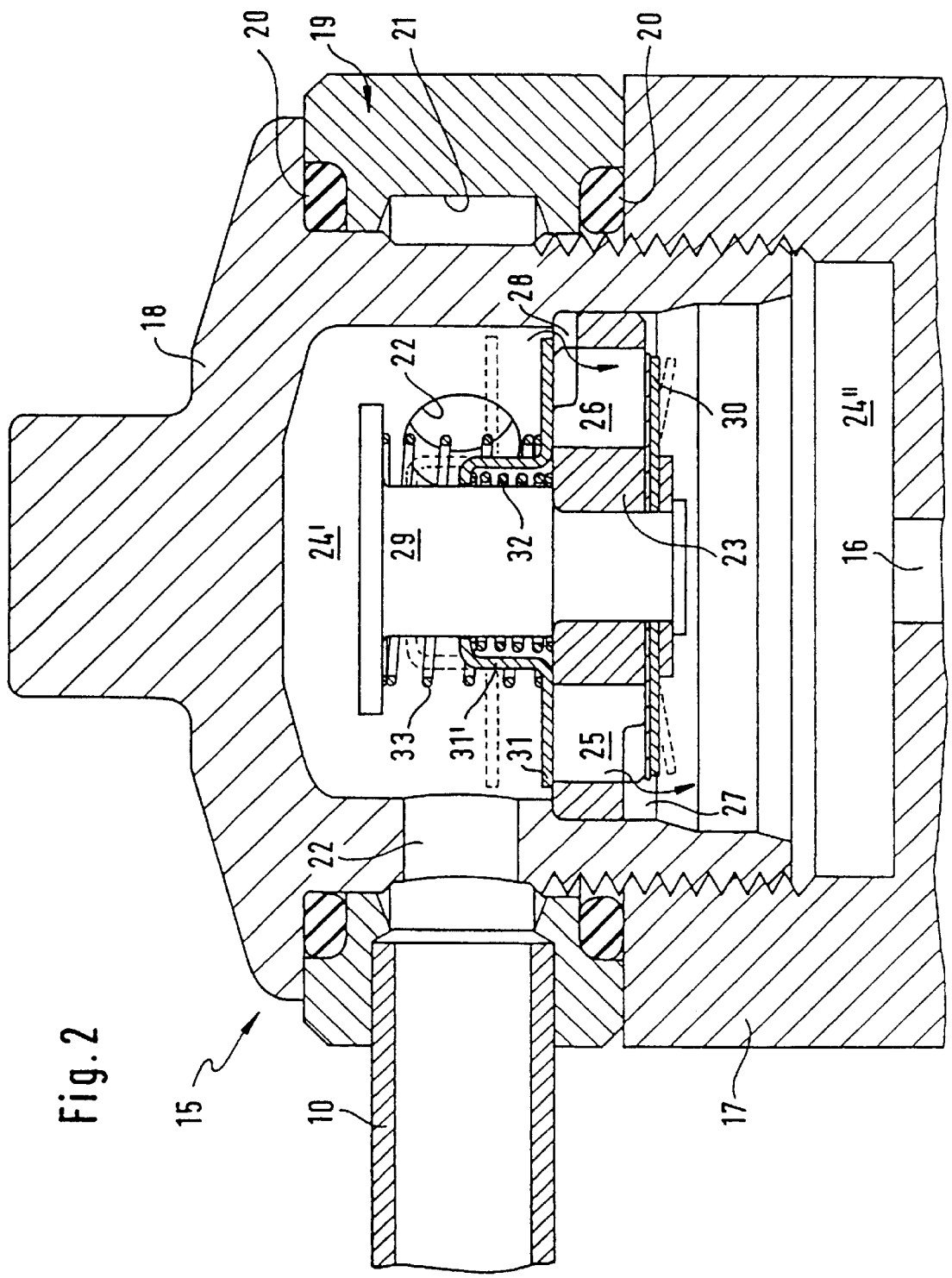
FIG. 2 is a sectional diagram of a first embodiment of a damper valve operating as a function of temperature.

FIG. 2, then, shows a first embodiment of a damper-valve arrangement 15.

On the piston/cylinder assembly 4, each chamber is provided with a connecting orifice 16 which is arranged within an internally threaded part 17 coaxially relative to the thread axis. A cap-shaped connecting part 18, with an external thread arranged thereon, can be screwed into the internally threaded part 17, and a holding ring 19 firmly connected to the motor line 10 can be axially clamped between mutually opposite flange faces on the internally threaded part 17, on one hand, and on the connecting part 18, on the other hand. The gaps between the end faces of the holding ring 19 and the confronting flange faces of the internally threaded part 17 and connecting part 18 are shut off in a pressure-resistant manner by sealing rings 20 on the holding ring 19.

The inner circumference of the holding ring 19 has a duct 21 which is configured in the manner of an annular groove and which communicates with the motor line 10 and with one or more radial bores 22 in the connecting part 18, and thus makes a connection between the motor line and the interior of the connecting part 18.

A carrier part is firmly held captive within the connecting part 18 and is in the form of a circular disc and, within the connecting part 18, separates a space 24' adjoining the radial bore or radial bores 22 and a space 24" adjoining the connecting orifice 16.

The carrier part 23 possesses axial bores 25 and 26. The axial bores 25 open into a depression 27 opened to the space 24" and located on the lower end face of the disc-shaped carrier part 23, and the axial bores 26 open into a similar depression 28 located on, in FIG. 2, the upper end face of the carrier part 23.

A bolt 29 is held in a central orifice of the carrier part 23 and holds spring plates 30 in the form of a circular disc on one end face of the carrier part 23—on the end face confronting the connecting orifice 16 in the example of FIG. 2—and, on the other end face of the carrier part 23, is configured as an axial guide for an annular disc 31.

The spring plates 30 are dimensioned in such a way that they at least essentially cover the axial bores 26 in the carrier part 23 and leave free relatively large regions of the depressions 27 assigned to the axial bores 25. The annular disc 31 is dimensioned to cover the axial bores 25 and leaves free, at least in regions, the depressions 28 assigned to the axial bores 26.

The inner circumference of the annular disc 31 has a sleeve-shaped extension 31' with an end-face flange which is angled towards the circumference of the bolt 29 and which surrounds the bolt 29 with slight radial play. In the annular space between the sleeve-shaped extension 31' and the outer circumference of the bolt 29, a first helical compression spring 32 is clamped between the annular flange of the extension 31' and the confronting end face of the carrier part 23. Moreover, a further helical compression spring 33 is clamped between the annular disc 31 and the confronting end face of a flange arranged at the free end of the bolt 29.

At normal operating temperatures, the helical compression spring 33 possesses high tension, as compared with the helical compression spring 32. Thereby, the helical compression spring 33 can urge the annular disc 31 against the carrier part 23 counter to the force of the helical compression spring 32.

The helical compression spring 33 consists of a form memory alloy which markedly changes its spring properties at a relatively low transition temperature, in such a way that, below the transition temperature, only spring tension which is low, as compared with the helical compression spring 32, remains. The helical compression spring 32 can constantly hold the annular disc 31, counter to the residual force of the helical compression spring 33, in a position in which the annular disc is lifted off from the carrier part 23.

The spring plates 30 may consist of normal spring steel or the like.

Instead, it is also possible for the spring plate 30 lowermost in FIG. 2 or a plurality of the lower spring plates 30 or all the spring plates 30 to be produced from form memory alloy. Thereby, the spring constant of the spring plate 30 and, consequently, their rigidity decrease markedly below a transition temperature.

Alternatively, two spring plates 30 consisting of different materials, which differ in their expansion behavior in response to temperature changes, can be combined in the manner of a bimetallic spring to form a bimetallic spring plate which increasingly lifts off with its outer circumference from the confronting end face of the carrier part 23 at falling temperatures.

The spring plates 30 and the annular disc 31 cooperate with the axial bores 25, 26 and the depressions 27, 28 as throttles.

At normal operating temperatures, the annular disc 31 and the spring plates 30 are urged elastically against the confronting end faces of the carrier part 23. With a hydraulic flow from the space 24' to the space 24", the hydraulic medium must then flow through a small free space past the outer edge of the annular disc 31 and through the depression 28 and the axial bores 26 and lift off the spring plates 30 from the underside of the carrier part 23. This results, overall, in a very high throttle resistance which leads to corresponding damping of the hydraulic flow and to the movement of the piston of the piston/cylinder assembly 4 occurring during this flow (for example, FIG. 1). In the opposite direction of flow, the hydraulic medium must flow past the outer edge of the spring plates 30 and through the depressions 27 and the axial bores 25 and, at the same time, raise the annular disc 31 counter to the force of the helical compression spring 33. Only slight throttling of the flow occurs in this case.

Below the transition temperature, the annular disc 31 lifts off from the carrier part 23, so that the flow resistance in the direction of the space 24" is greatly reduced, since the axial bores 25 are then opened also in this direction of flow.

Insofar as the spring plates 30 consist completely or partially of form memory alloy, their rigidity markedly decreases below its transition temperature, so that, in the case of a flow from the space 24' to the space 24", the spring plates 30 can bring about only a markedly reduced throttle resistance.

If the spring plates 30 are a bimetallic plate, an arrangement in which the spring plates 30 lift off completely from the carrier part 23 at a falling temperature is possible, with the result that the throttle resistance brought about by the spring plates 30 decreases in both directions of flow.

Spring elements consisting of form memory alloy have a "switching behavior", that is to say, when the transition temperature is exceeded or undershot, the state of the spring element changes from soft to hard, and vice versa. The influences of temperature may otherwise be largely ignored. This is equivalent to a situation where the helical compression spring 33 consisting of form memory alloy "switches" the annular disc 31 to throttle-active above the transition temperature and makes it throttle-inactive below the transition temperature. The it throttle resistance brought about by the annular disc 31 is consequently changed over "abruptly" between high and low.

Bimetallic elements may change their form within a wide temperature range, that is to say, the throttle resistance controlled by these elements varies within a wide temperature range.

Figure 3:
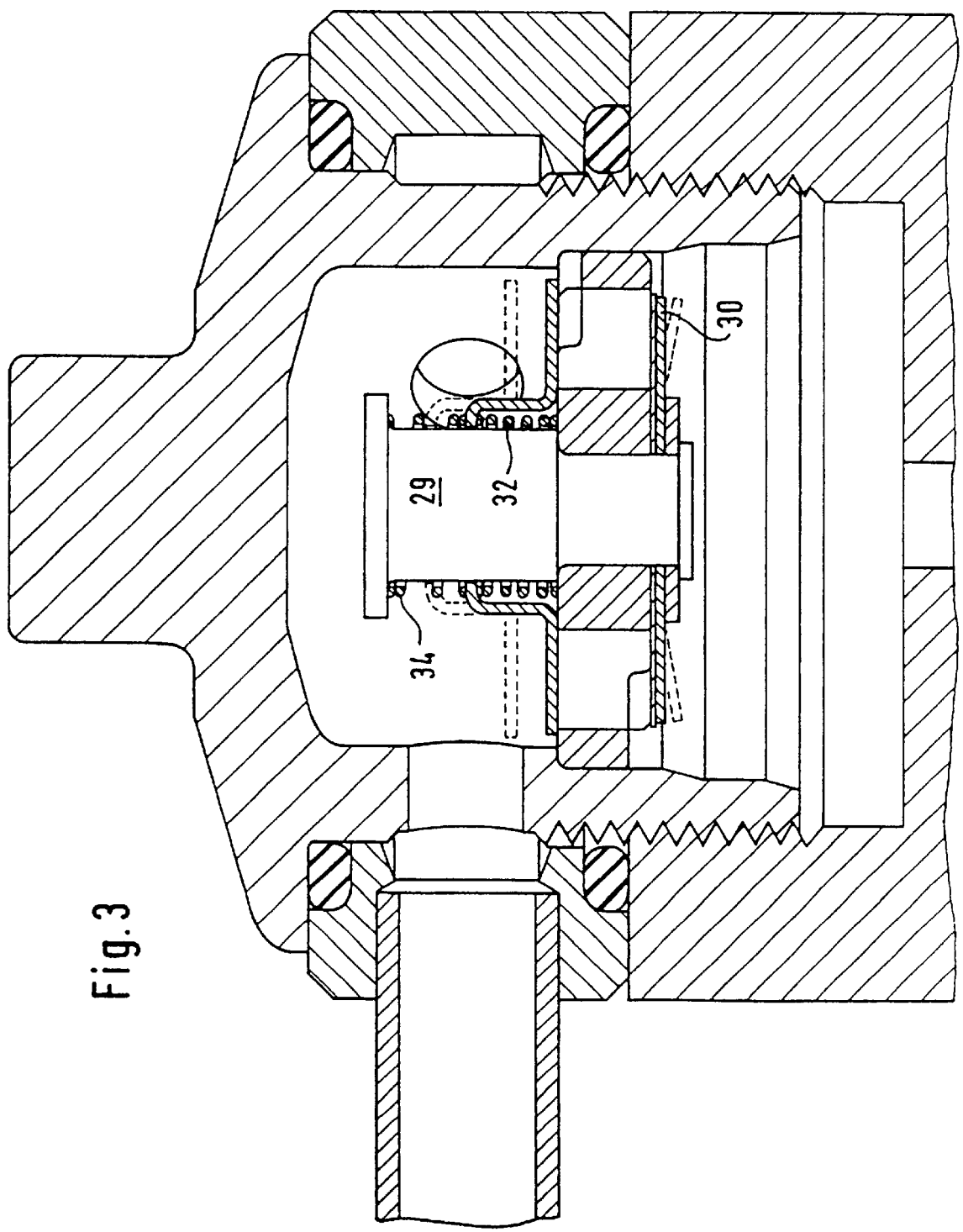
FIG. 3 is a sectional diagram of a modified embodiment.

The embodiment illustrated in FIG. 3 differs from the embodiment according to FIG. 2 only in that the helical compression spring 33 of FIG. 2 is omitted and replaced by a helical compression spring 34 which is clamped between the annular flange at, in FIG. 3, the upper end of the sleeve-shaped extension 31' and the annular flange at the free end of the bolt 29. The spring 34 consists of a form memory alloy, in such a way that the helical compression spring 34 has a high spring tension above a transition temperature and a low spring tension below the transition temperature. This results in an operating behavior basically identical to that of FIG. 2.

Figure 4:
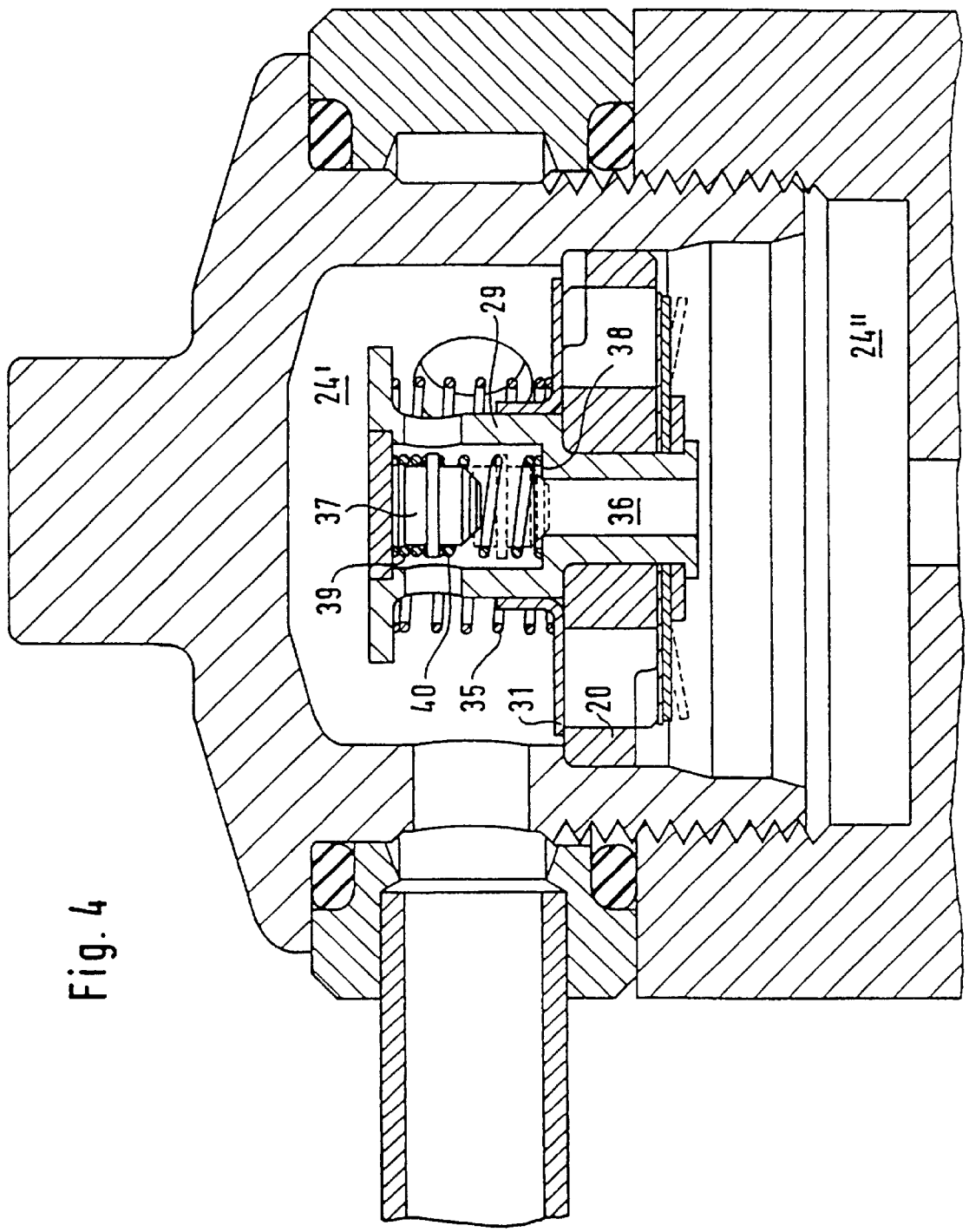
FIG. 4 is a sectional diagram of a further variant.

In the embodiment according to FIG. 4, the annular disc 31 is tensioned against the carrier part 23 by a helical compression spring 35 which operates largely without any temperature dependence.

Arranged within the bolt 29 is a bypass duct 36 which opens into the space 24" via an axial bore in the bolt 29 and into the space 24' via radial bores. Arranged axially displaceably within a diametrically widened region of the bypass duct 36 is a piston-like slide 37 which can cooperate in the manner of a valve body with an annular step 38 in the bypass duct 36 and which cuts off the latter when the said slide sits on the annular step 38. The slide 37 is loaded in directions opposite to one another by two helical compression springs 39, 40. The helical compression spring 39 consists of form memory alloy and, above a transition temperature, has sufficiently high tension such that it can urge the slide 37 against the annular step 38 counter to the force of the spring 40. Below the transition temperature, the force of the helical compression spring 40 is sufficient to lift off the slide 37 from the annular step 38 counter to the residual force of the spring 39, to an extent such that the bypass duct 36 is largely opened.

Figure 5:
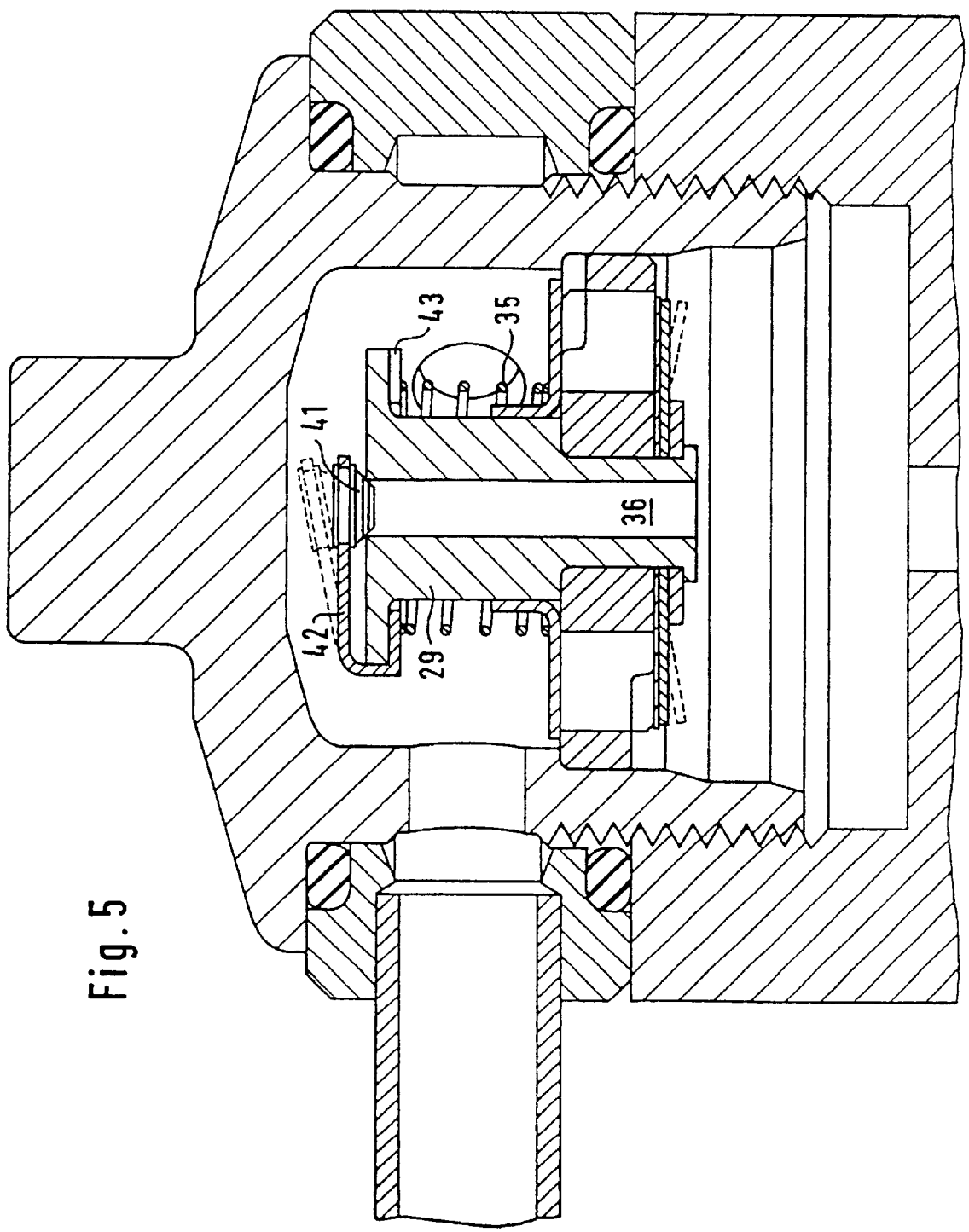
FIG. 5 shows a fourth embodiment of the present invention.

The embodiment according to FIG. 5 differs from the embodiment according to FIG. 4 in that the bypass duct 36 is an axial bore in the bolt 29 and is controlled by a sealing cone 41 arranged on a bimetallic spring 42 held on a C-shaped annular part 43 which is arranged on the side, facing the carrier part 23, of the annular flange at the free end of the bolt 29 and which is tensioned against the said annular flange by the helical compression spring 35. The bimetallic spring 42 is configured so that it increasingly urges the sealing cone 41 against the end-face orifice of the bypass duct 36 at rising temperature and lifts off the sealing cone 41 from the end-face orifice at low temperature.

Figure 6:
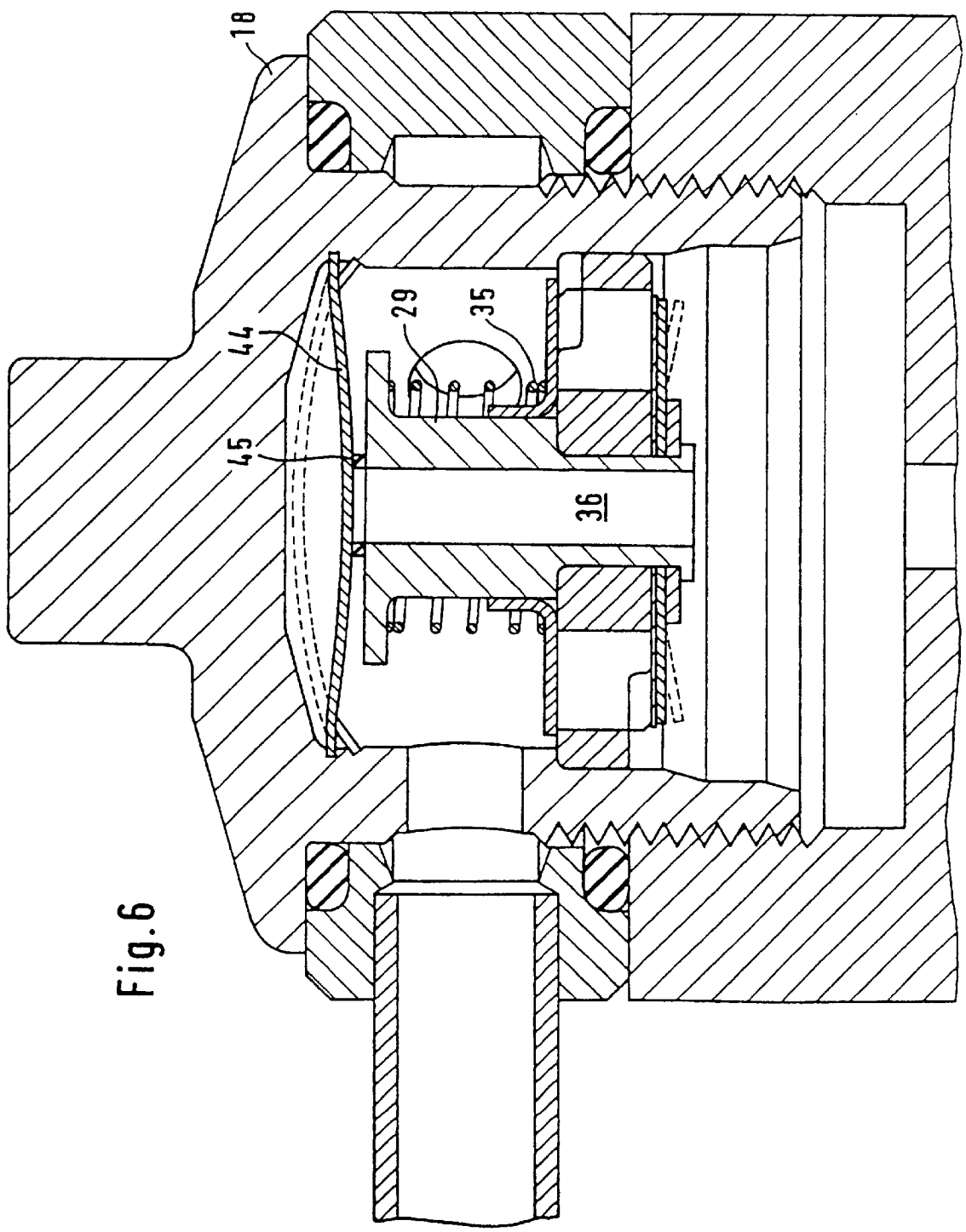
FIG. 6 shows a fifth embodiment.

The embodiment according to FIG. 6 differs from the embodiment according to FIG. 5 in that the bypass duct 36 configured as an axial bore of the bolt 29 is controlled by a bimetallic disc 44 which is held with a toothed edge in an annular groove on the inner wall of the connecting part 18 and which is constructed as a snap spring which, at higher temperature, is tensioned, with a sealing ring 45 vulcanized thereon, against the confronting end-face edge of the bypass duct 36 and, at decreasing temperature, lifts off from the confronting end face of the bolt 29.

Figure 7:
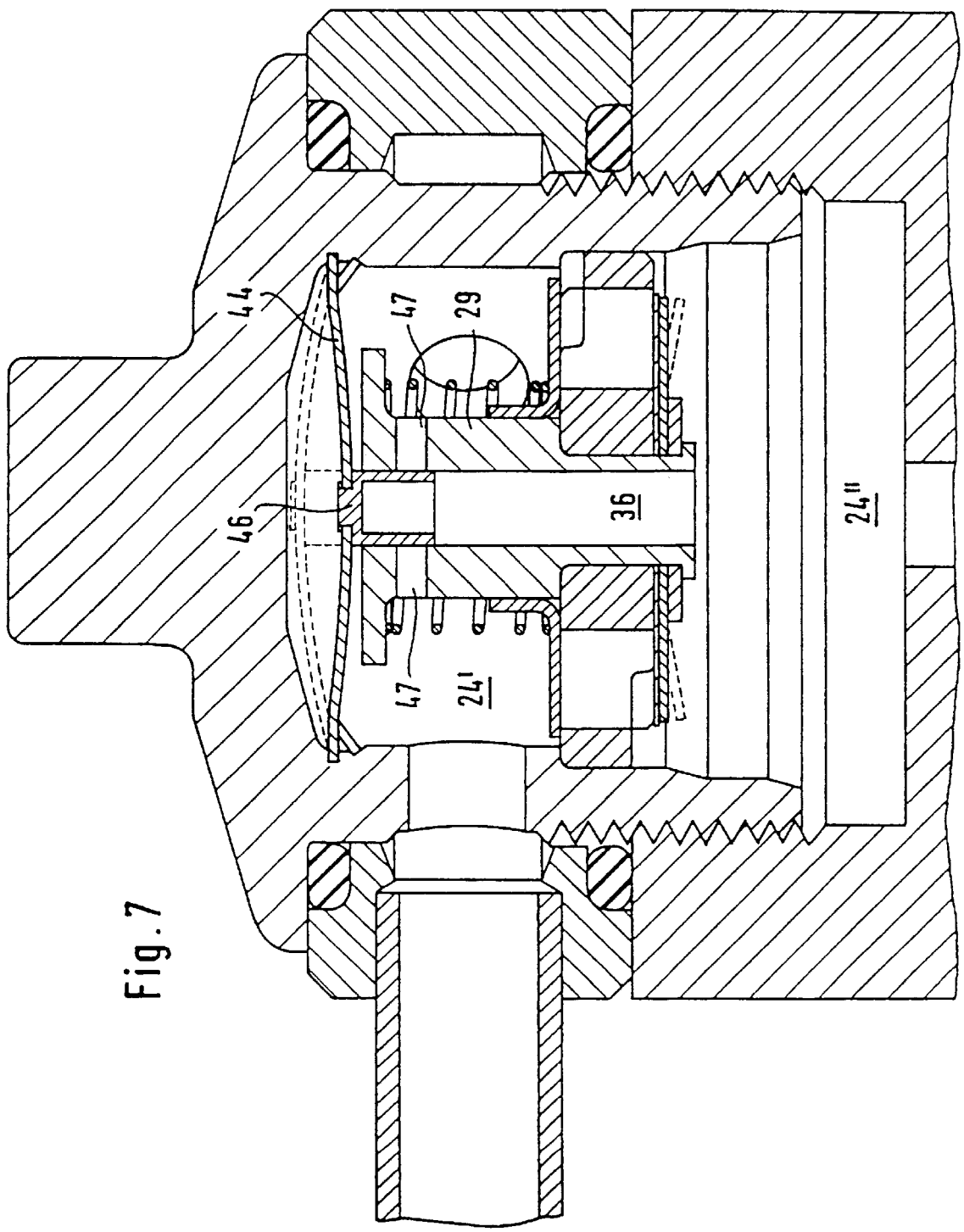
FIG. 7 shows a sixth embodiment.

In the embodiment illustrated in FIG. 7, the bimetallic disc 44 controls a slide 46 which is held on the latter in a centring orifice and which is axially displaceable in the axial bore of the bolt 29, the axial bore being formed by the bypass duct 36, and, in the pushed-in position illustrated, axially covers radial bores 47 in the bolt 29. The bimetallic disc 44 pushes the slide 46 into this illustrated position at higher temperature, so that there is no connection between the spaces 24', 24" via the bypass duct 36. As soon as the temperature decreases sufficiently, the bimetallic disc 44 snaps over into the state illustrated by broken lines, and the slide 46 is drawn sufficiently far out of the bypass duct 36, so that the radial bores 47 are exposed to a greater or lesser extent, and the spaces 24', 24" communicate with one another via the bypass duct 36.

Figure 8:
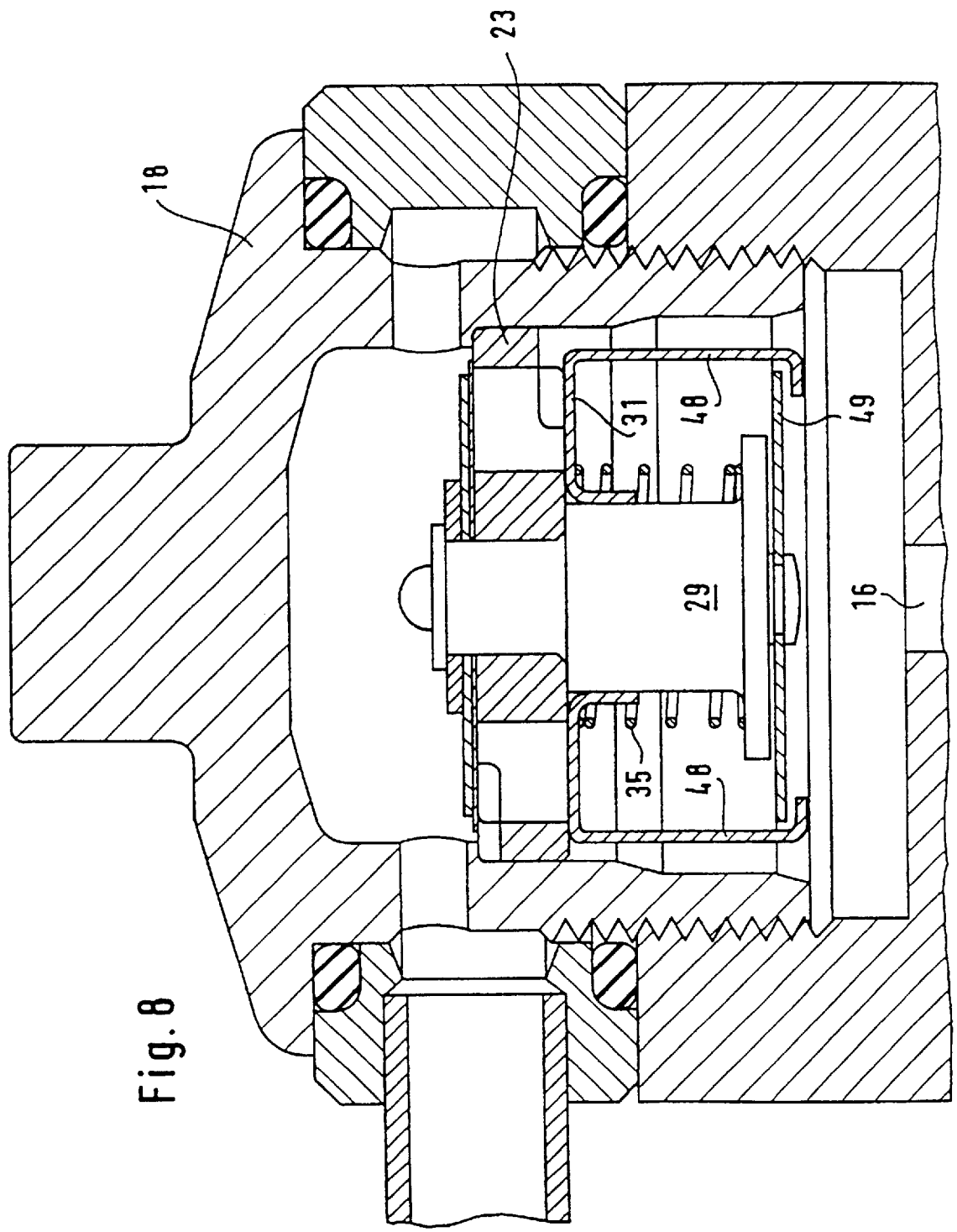
FIG. 8 shows a seventh embodiment.

FIG. 8 illustrates, in the first place, that the carrier part 23 having the bolt 29 can also be "reversed" in the connecting part 18, i.e., the free end of the bolt 29 faces the connecting orifice 16.

The outer circumference of the annular disc 31 has two narrow stirrup-shaped arms 48 with ends which are angled in a hook-like manner and which engage around a bimetallic disc 49 arranged on the free end of the bolt 29.

At higher temperature, the bimetallic disc 49 assumes its non-curved disc-shaped state. In this state, the helical compression spring 35 can urge the annular disc 31 against the carrier part 23, and slight axial play still remains between the hook-shaped ends of the arms 48 and the bimetallic disc 49. As soon as the temperature falls sufficiently, the bimetallic disc 49 assumes its curved state, with the concave side facing the connecting orifice 16. The result is that the annular disc 31 is drawn by its arms 48 away from the carrier part 23 counter to the force of the helical compression spring 35 and is held at an axial distance from the carrier part 23.

Figure 9:
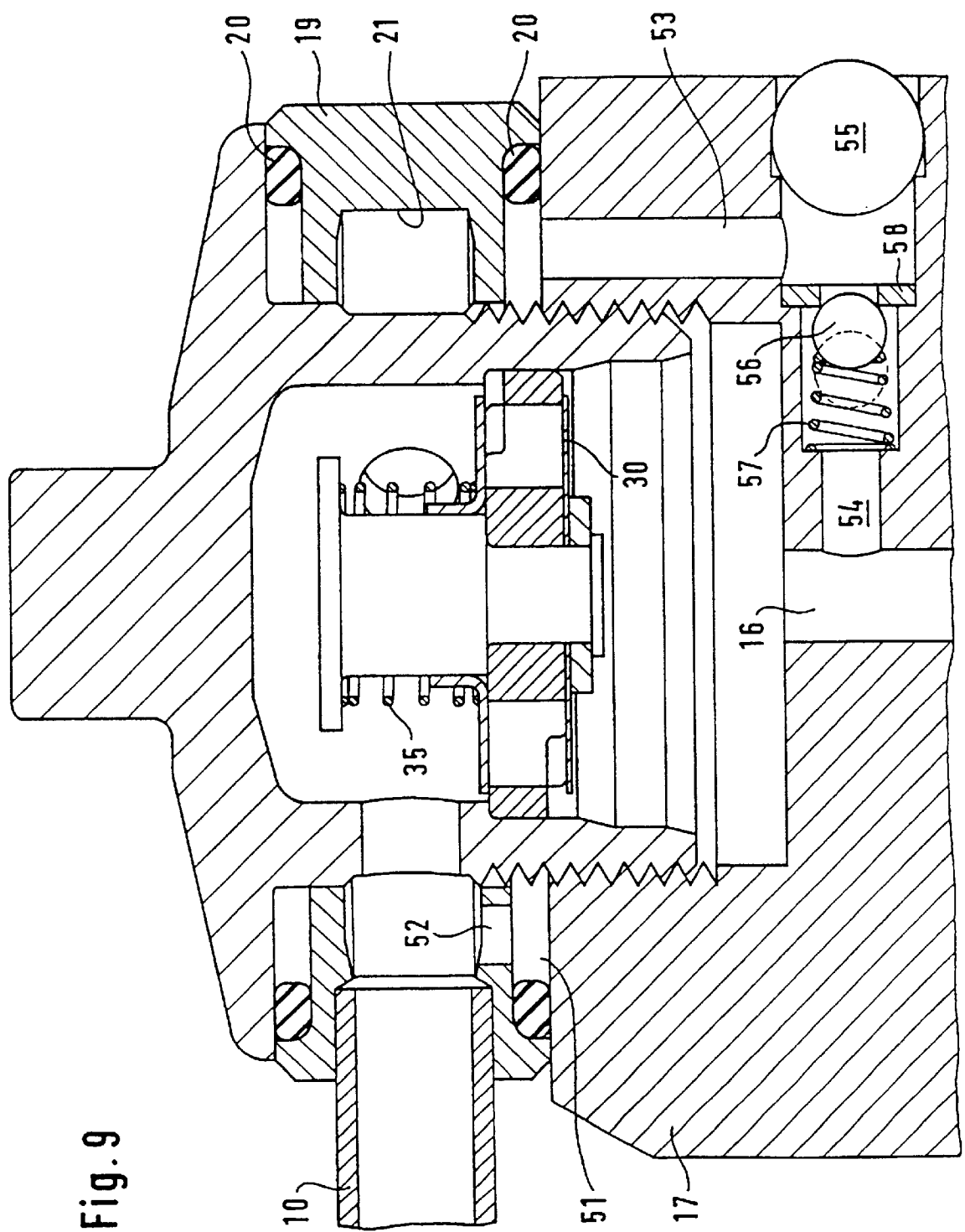
FIG. 9 shows an eighth embodiment.

The embodiment in FIG. 9 shows an embodiment for arranging a controllable bypass duct 53, 54 within the connecting parts 17.

In this embodiment, the holding ring 19 has axial dimensions radially reduced within the sealing rings 20, so that, when the holding ring 19 is in its mounted position, an annular duct 51 is formed at least on that end face of the said holding ring which faces the connecting part 18. This annular duct 51 is connected to the duct 21 via axial bores 52 and accordingly communicates with the motor line 10.

At least one axial bore 53 is arranged within the connecting part 17 so that the said axial bore communicates with the annular duct 51. This axial bore 53 is connected to the connecting orifice 16 in the connecting part 17 via a stepped radial bore 54. The radial bore 54, closed off relative to the outside by a spherical plug 55, comprises a nonreturn valve with an illustrated spherical valve body 56 which is urged against a seat 58 in the form of an annular disc by a valve spring 57 designed as a helical compression spring. This spring 57 consists of a form memory alloy and, above a transition temperature, possesses a comparatively high spring tension, whereby the valve body 56 can be moved in the opening direction only in the event of a relatively high pressure gradient. Below the transition temperature, the spring 57 possesses extremely low spring tension, with the result that the valve body 56 can move in the opening direction even when there is only a slight pressure gradient. Consequently, at temperatures below the transition temperature, a low-throttle path is opened up from the motor line 10 to the connecting orifice 16.

In addition to the statements made above, the damper valves 15 may also be arranged on the housing of the servo valve 9 to form with the servo valve a valve module capable of being completely preassembled.

In this case, according to a first embodiment, the damper valves can be accommodated in the above-illustrated way in hollow-screw-like connecting parts at corresponding connections of the servo-valve housing.

Instead, it is also possible, and advantageous, to accommodate the damping-active elements in housing bores of the servo-valve housing.

Figure 10:
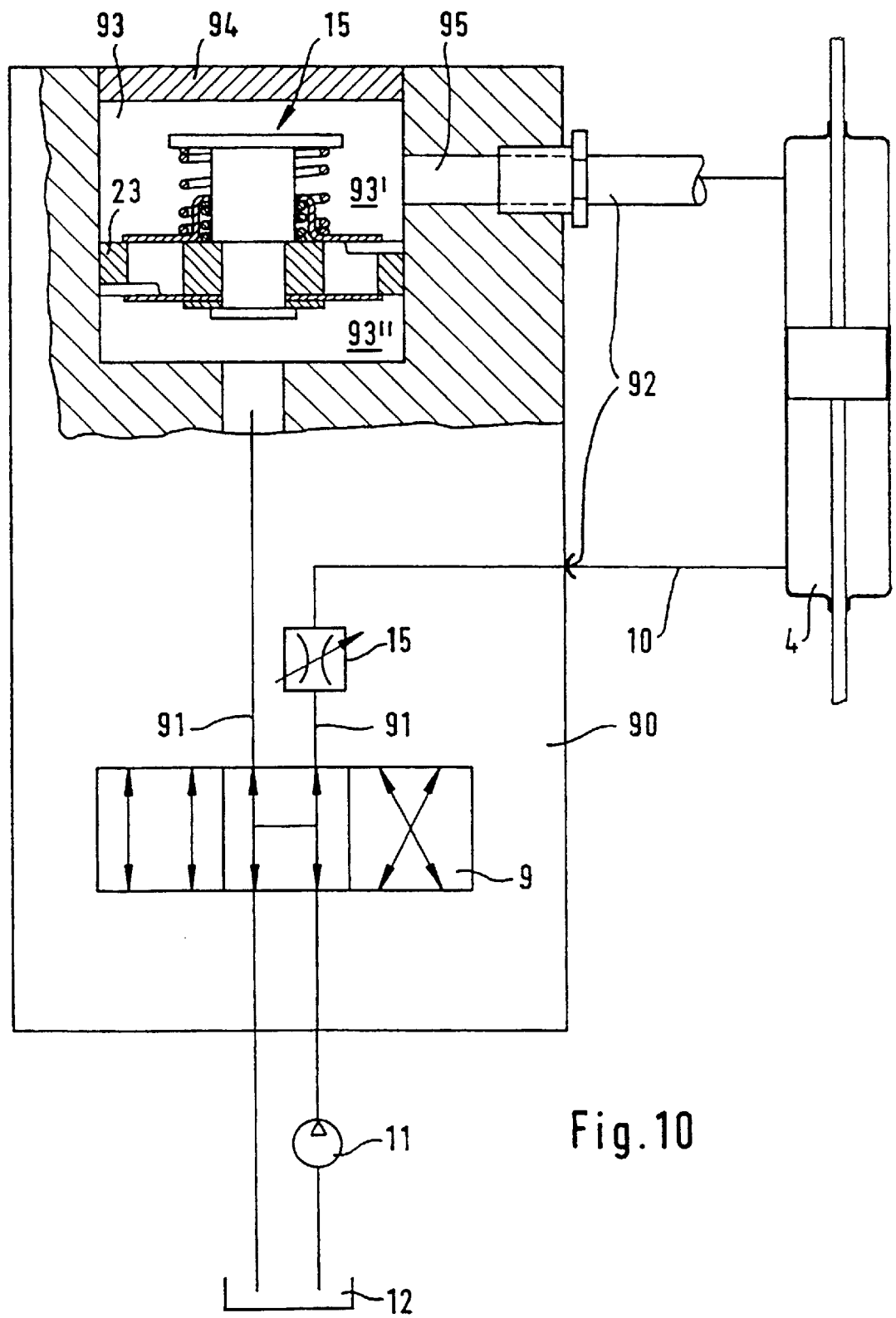
FIG. 10 shows yet another embodiment in which the damper valves are arranged in the housing of the servo valve.

FIG. 10 shows an embodiment which is expedient in design terms for this purpose.

The servo valve 9 is accommodated in a housing 90 which is illustrated partly diagrammatically and partly sectionally, as a detail, in FIG. 10.

Two ducts 91 are provided on the outlet side of the servo valve 9 and are designed as housing bores, each being connected via one of the damper-valve arrangements 15 to a connection 92 for the lines 10 leading to the servomotor 4.

Each part of the duct 91 which comes from the servo valve 9 widens in a step-shaped manner, within the housing 90, into a chamber 93 which has a circular cross section and which is shut off by a, for example, pressed-in cover 94 on that outer face of the housing 90 which extends transversely to the axis of the chamber 93. Each chamber 93 is subdivided, by a carrier part 23 pressed thereinto, into a part-space 93' and a part-space 93". A transverse bore 95 leading to the respective connection 92 branches off from the part-space 93'. The carrier part 23 has a configuration corresponding to one of FIGS. 2 to 8, so that reference may be made to the corresponding parts in the description. The carrier part 23 is equipped with damping-active elements in the same way as in the abovementioned figures.

The embodiment according to FIG. 10 may be advantageous for reasons of cost, because there need merely be additional bores and the like on the housing 90 of the servo valve 9 and the shape of the housing has to be dimensioned merely for arranging the additional bores and the like. As compared with, particular, the embodiments of FIGS. 2 to 9, the comparatively complicated connecting part 18 may be dispensed with. Moreover, the motor lines 10 may have conventional connecting parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic power steering system, comprising a servo valve, a servomotor configured as one of a hydrostatic motor assembly and a hydraulic displacer assembly and arranged to act as a steering damper, damper-valve arrangements operatively provided on hydraulic lines between the servomotor and the servo valve, the damper-valve arrangements having a circular disc carrier part, with axial bores and with a central bolt which holds circular disc spring plates for controlling some of the axial bores and, on a side of the carrier part facing away from the spring plates, guiding an annular disc for controlling other of the axial bores, a bypass duct hydraulically connecting spaces on sides of the carrier part and arranged in the central bolt, and in that there is arranged axially displaceably, and a piston-like slide within a diametrically widened region of the bypass duct to cooperate with an annular step in the bypass duct in a valve-body-like manner and to be loaded in directions opposite to one another by two helical compression springs, one of the compression springs operating as a function of temperature, so that, below a predetermined temperature, the slide is lifted off from the annular step and simultaneously opens the bypass duct.

2. A hydraulic power steering system, comprising a servo valve, a servomotor configured as one of a hydrostatic motor assembly and a hydraulic displacer assembly to act as a steering damper, damper-valve arrangements operatively provided on hydraulic lines between the servomotor and the servo valve, the damper-valve arrangements having a circular-disc carrier part with axial bores and with a central bolt which holds circular-disc spring plates for controlling certain of the axial bores and on a side of the carrier part facing away from the spring plates, guides an annular disc for controlling others of the axial bores, a bypass duct hydraulically connecting spaces on sides of the carrier part and arranged in the bolt, the bypass duct being controlled by a sealing cone arranged on a bimetallic spring, the bimetallic spring being held on a C-shaped annular part arranged on a free end of the bolt and configured so that, at rising temperature, the bimetallic spring increasingly urges the sealing cone against an orifice of the bypass duct at a free end and, at low temperature, lifts off the sealing cone from the orifice.

3. A hydraulic power steering system, comprising a servo valve, a servomotor configured as a hydrostatic motor assembly or as a hydraulic displacer assembly to act as a steering damper, damper-valve arrangements operatively arranged on hydraulic lines between the servomotor and the servo valve and having a circular-disc-like carrier part with axial bores and a central bolt which holds circular-disc-like spring plates for controlling certain of the axial bores and on a side of the carrier part facing away from the spring plates, guides an annular disc for controlling other of the axial bores, the damper-valve arrangement being arranged in screwed-together connecting parts which connect the hydraulic lines to a housing of the servomotor or the servo valve, and a bypass duct hydraulically connecting spaces on sides of the carrier part, being arranged in the central bolt and being controlled by a bimetallic disc held with a toothed edge in an annular groove on an inner wall of one of the connecting parts and configured as a snap spring such that the bypass duct is openable at low temperature.

4. A hydraulic power steering system, comprising a servo valve, a servomotor configured as a hydrostatic motor assembly or as a hydraulic displacer assembly to act as a steering damper, and damper-valve arrangements operatively arranged on hydraulic lines between the servomotor and the servo valve, and having a circular-disc-like carrier part with axial bores and a central bolt which holds circular-disc-like spring plates for controlling certain of the axial bores and, on a side of the carrier part facing away from the spring plates, guides an annular disc for controlling other of the axial bores, the annular disc being loaded in opposite directions by springs, wherein one of the springs operates as a function of temperature so that, below a predetermined temperature, the annular disc is urged into a position lifted off from the carrier part.

5. A steering system according to claim 4, wherein two helical compression springs acting in opposite directions are arranged to load the annular disc, one of the helical compression springs comprising a form memory alloy and, above a transition temperature, the annular disc pressing against the carrier part to thereafter become throttle-active.

6. The steering system according to claim 4, wherein a bimetallic disc is provided to draw, at low temperature, the annular disc into an open position counter to a force of a temperature-independent spring.

\* \* \* \* \*